United States Patent Office 3,536,662
Patented Oct. 27, 1970

---

3,536,662
PHENOLIC ANTIOXIDANTS FOR LOW UNSATURATION HYDROCARBON POLYMERS
Edward M. Bevilacqua, Allendale, N.J., assignor to Uniroyal, Inc., New York, N.Y., a corporation of New Jersey
No Drawing. Filed Mar. 18, 1968, Ser. No. 714,095
Int. Cl. C08f 45/58
U.S. Cl. 260—45.95        10 Claims

ABSTRACT OF THE DISCLOSURE

Unhindered phenols—that is, phenols with no ortho substituents other than hydrogen—such as 4,4'-isopropylidenebisphenol, p-phenylphenol, 4,4'-biphenol and 4,4'-cyclohexylidenebisphenol have been found to be superior antioxidants for hydrocarbon polymers of low unsaturation (e.g., EPT, butyl rubber). These antioxidants are binuclear phenols joined together with either one or no carbon atoms between the aromatic nuclei. They are better antioxidants than many widely used materials (including certain hindered phenols) when the unsaturation in the polymer is incorporated in a five or six-membered ring (as in EPT in which the diene is dicyclopentadiene).

BACKGROUND OF THE INVENTION

Field of the invention

The invention relates to antioxidants for low unsaturation hydrocarbon polymers.

Description of the prior art

It is a widely held belief that phenols are most effective as antioxidants in hydrocarbon polymers if they are hindered, that is, if they have at least one, preferably a bulky, substituent ortho to the hydroxyl group. This is particularly true in unsaturated elastomeric polymers, as may be seen in the comprehensive review article in 1963 in "Rubber Chemistry and Technology" volume 36, pages 1497 and following, by Ambelang and others. This reviews structures of antioxidants considered useful or potentially useful in elastomers. In the extensive tables listing structures, and in the text, unhindered phenols are not mentioned. Similarly, the comprehensive review "Atmospheric Oxidation and Antioxidants," by Gerald Scott, Elsvier Publishing Company, Amsterdam, 1965, contains no evidence that ortho unsubstituted phenols are particularly effective in low unsaturation rubbers.

The following patents disclose the use of an unhindered phenol, "Bisphenol-A" (p,p'-isopropylidenebisphenol), as an antioxidant in highly unsaturated rubber: Murke and Becker, U.S. Pat. 2,270,959 (also showing p,p'-cyclohexylidenebisphenol), ICI's British Pat. 355,425, and Goodyear's British Pat. 376,818. Latham et al. 2,434,662 shows the use of isopropylidenebisphenol in polypropylene.

Other categories of phenols employed in the present invention are also known as antioxidants for highly unsaturated rubber: Biphenylol, $C_6H_5$—$C_6H_4$—OH, is disclosed by Calcott and Douglass, U.S. Pat. 1,830,749; the compound 4,4'-biphenol, HO—$C_6H_4$—$C_6H_4$—OH, is disclosed by I.G.F.'s British Pat. 350,563 and I.C.I.'s British Pat. 363,340.

The literature is full of examples of derivatives of bisphenol-A, prepared in attempts to get improved effectiveness as an antioxidant, and such derivatives are commercially offered and used as hydrocarbon antioxidants. Bisphenol-A is not promoted as an antioxidant for unsaturated elastomers; in highly unsaturated rubbers, it is inferior to those which are used.

The compounds employed in the present invention are not as good as other antioxidants in saturated hydrocarbons; the lower limit on unsaturation in the polymers employed in the present invention is an iodine number of 1.

The use of biphenol-A as a stabilizer in polyvinyl chloride resin is disclosed in Fisher, U.S. Pat. 2,824,679 and Pazinski et al., U.S. Pat. 3,075,940, but most stabilizers for PVC are ineffective in unsaturated hydrocarbon polymers, and there is nothing in application in PVC to suggest that it would be effective in the elastomers.

SUMMARY OF THE INVENTION

The essence of the present invention is the recognition that certain phenols of a specified structure are superior to any others in certain low-unsaturation rubbers.

The invention is a composition comprising a hydrocarbon polymer of low unsaturation, containing as an antioxidant one or more binuclear phenols joined together with either one or no carbon atoms between the aromatic nuclei, with no ortho substituents other than hydrogen (that is, the phenols are "unhindered"). The invention is based on the surprising discovery that such unhindered phenols are antioxidants for hydrocarbon polymers of low unsaturation, being particularly useful for storage stability, and that, further, in polymers in which the unsaturation is present in a five- or six-membered ring they are better antioxidants than many materials widely used.

DESCRIPTION OF THE PREFERRED EMBODIMENTS

The antioxidants employed in the invention may be illustrated more specifically by the compounds of the following structural formulas:

(1) Phenols $RC_6H_4C_6H_4OH$ in which R may be hydrogen, an alkyl group (e.g., methyl, ethyl, isopropyl, butyl), or phenyl, and the group $RC_6H_4$ is only at position 3 or 4 of the phenolic nucleus.

(2) Phenols (—$C_6H_4OH$)$_2$ in which the hydroxyl groups are at any two of the positions, 3,3'4,4',5,5'.

(3) Phenols $R'R''C(C_6H_4OH)_2$ in which R' and R'' may each be hydrogen, and alkyl group as above, both part of an aliphatic ring or phenyl, and the group R'R''C< is connected to the phenolic nuclei only at two of the positions 3,3',4,4',5,5'.

All of these may contain substituents at other sites in the molecule, so long as there is no substitution ortho to the phenolic hydroxyls.

The present antioxidants may be used in conventional proportions, in the usual small but effective amounts. By way of non-limiting illustration, it may be stated that the proportions are usually from 0.02 to 5 parts by weight of the antioxidant chemical per 100 parts by weight of the hydrocarbon polymer, the preferred range being 0.02 to 1.0.

The hydrocarbon polymers of low unsaturation employed in the invention have a degree of unsaturation corresponding to an iodine number in the range 1–25, the preferred range being 2–15. Such hydrocarbon polymers include the copolymers of one or more alpha-monoolefins, such as ethylene, propylene, butene-1, pentene-1, etc. with a small proportion of a copolymerizable nonconjugated diene, whether an open-chain diene such as 1,4-hexadiene, or a cyclic diene such as the bridged-ring dienes, e.g., dicyclopentadiene, ethylidenenorbornene, methylenenorbornene, cyclooctadiene, methylenetetrahydroindene, and the like. Preferred are those dienes which result in a copolymer having residual unsaturation present in a 5- or 6-membered ring.

The antioxidant may be incorporated in the polymer in any suitable conventional manner, for example by milling the polymer with the desired quantity of antioxidant. If desired, the antioxidant may be added to a cement or latex containing the polymer. Other conventional compounding ingredients may be present, including vulcanizing agents, accelerators, or fillers, lubricants, plasticizers or processing aids, retarders, extender oils, etc.

Different measures of the resistance of a polymer to oxidation may be used. In all of the examples illustrating the invention which follow, the same method was used: the time required for a specimen weighing approximately 2 grams to absorb 20 cc. of oxygen per gram in an atmosphere of oxygen was determined. This is tabulated in the examples, in minutes, as $t_{20}$. The temperature is specified in the examples.

A terpolymer of ethylene, propylene, and ethylidenenorbornene (U.S. Pat. 3,151,173 or Belgian Pat. 697,049), containing 62% ethylene and 3% ethylidenenorbornene (Iodine No. =6.3), may be substituted in the following examples.

EXAMPLE 1

This example shows that an unhindered bisphenol such as 4,4'-isopropylidene bisphenol is only a moderate antioxidant in a highly unsaturated rubber but is very effective in a rubber of low unsaturation. Four antioxidants were compared in two elastomers, as shown in Table I. For this purpose a standard emulsion SBR containing a conventional antioxidant was sheeted to approximately 1 mm. in thickness on a cool calender (not more than 150° F.). To remove the conventional antioxidant a 2 gram specimen of the sheet was soaked overnight (about 18 hours) in an excess of acetone. To introduce the antioxidant being tested, the sample was then soaked twice overnight (18 hours), in 500 ml. of acetone containing the desired antioxidant in a concentration of 0.25% by weight. The sample absorbed its own weight of the acetone solution. Then the specimen was air dried overnight in total darkness at room temperature, and thereafter subjected to vacuum for 5 minutes at 150° C. The antioxidants were incorporated in the ethylene, propylene, dicyclopentadiene terpolymer by addition in solution to a solution of polymer (e.g., add 2.5 grams of a 10% solution of the chemical in hexane or benzene to 2000 grams of 5% solution of the polymer in n-hexane), which was then dried (overnight in air at room temperature; final drying 5 minutes in vacuo at 150° C.) to give the specimens tested. The concentration of each antioxidant in the rubber was 0.25% by weight.

TABLE I.—$t_{20}$ (IN MINUTES)

| Antioxidant | In SBR[1] at 130° C. | In EPT[2] at 150° C. |
|---|---|---|
| None | 53 | 45 |
| 2,2'-methylenebis(4-methyl-6-t-butylphenol) | >480 | 220 |
| 4,4'-thiobis(3-methyl-6-t-butylphenol) | >480 | 195 |
| N,N-dimethyl-N,N'-bis(3-t-butyl-4-hydroxy-5-methyl)hydrazine | >480 | 236 |
| 4,4'-isopropylidenebisphenol | 268 | [3]>480 |

[1] SBR, a commercial emulsion copolymer of styrene and butadiene containing approximately 23% styrene combined in the polymer.
[2] EPT, a commercial terpolymer of ethylene, propylene, and dicyclopentadiene containing approximately 62% ethylene and 3% dicyclopentadiene combined in the polymer, and an Iodine number at 5.8.
[3] This composition represents the invention; the other stocks in the table are outside the invention.

EXAMPLE 2

This example shows that phenols of this invention are effective, while phenols of related structure but substituted ortho to the hydroxyl group are not.

TABLE II

| Phenol: | $t_{20}$ in EPT at 150° C. (0.25% antioxidant) |
|---|---|
| (A) p-phenylphenol | 376 |
| (B) o-phenylphenol | ~50 |
| (C) 4,4'-biphenol | >470 |
| (D) 2,2'-biphenol | 287 |

The phenols in Table II were added to a solution of the EPT of Example 1 as described there and the dried rubber specimens oxidized as described. A and C represent the invention; B and D are outside the invention.

EXAMPLE 3

This example shows that phenols of this invention are more effective in a low unsaturation rubber than are commercial phenolic antioxidants and other phenols of similar structure but containing aliphatic substitution ortho to the phenolic hydroxyl group. Phenols listed in Table III were added to a solution of an EPT rubber similar to that of Example 1 except that it had approximately 5% by weight of dicyclopentadiene combined in the polymer with an Iodine No. of 9.6; the specimens were dried at room temperature in air and oxidized as described above.

TABLE III

| Compound: | $t_{20}$ (at 150° C.) |
|---|---|
| (A) 4,4'-cyclohexylidenebisphenol | >480 |
| (B) 4,4' - isopropylidenebis(2,6 - dimethylphenol) | 117 |
| (C) 4,4' - methylenebis(2 - methyl - 6 - t-butylphenol) | 348 |

A represents the invention, B and C are outside the invention.

EXAMPLE 4

This example shows that phenols of the invention are effective in low unsaturation polymers of a wide range of structures. 4,4'-isopropylidenebisphenol was added to separate specimens of antioxidant-free elastomers listed in Table IV by infusion and resistance to oxidation determined as described. In all of them it protected against oxidation.

TABLE IV

| Polymer | Antioxidant concentration | Temperature, ° C. | $t_{20}$ |
|---|---|---|---|
| Isobutylene-isoprene copolymer, approximately 1.2 weight percent unsaturation, (Iodine No. =4.5) | 0 | 140 | 268 |
| Same | 0.25 | 140 | 279 |
| Ethylene, propylene, 1,4-hexadiene terpolymer, approximately 6.0 weight percent unsaturation, (Iodine No. =18.6) | 0 | 150 | 236 |
| Same | 0.05 | 150 | 350 |
| Ethylene, propylene, methylenenorbornene terpolymer, approximately 2.5 weight percent unsaturation, (Iodine No. =5.6) | 0 | 150 | 36 |
| Same | | | |
| Ethylene, propylene, cyclooctadiene terpolymer approximately 6.0 weight percent unsaturation, (Iodine No. =14.2) | 0 | 150 | 70 |
| Same | 0.25 | 150 | 400 |

Having thus described my invention what I claim and desire to protect by Letters Patent is:

1. Composition comprising unsaturated hydrocarbon polymer having an iodine number in the range from 1 to 25, and an antioxidant amount of a binuclear phenol joined together with either one or no carbon atom between the aromatic nuclei, and having no ortho substituents other than hydrogen, selected from those of the structural formulas:

(i) $RC_6H_4C_6H_4OH$ in which R may be hydrogen, an alkyl group having up to 4 carbon atoms or phenyl, and the group $RC_6H_4$ is located only at position 4 of the phenolic nucleus;

(ii) $(-C_6H_4OH)_2$ in which the hydroxyl groups are at the 4,4' positions; and (iii) $R'R''C(C_6H_4OH)_2$ in which R' and R'' may each be hydrogen, an allyl group having up to 4 carbon atoms, phenyl, or may have values such that the group $R'R''C<$ is cyclohexylidene, and the group $R'R''C<$ is connected to the phenolic nuclei only at the 4,4' positions; the said polymer being selected from ethylenepropylene - non - conjugated diene terpolymer rubber and isobutylene-isoprene copolymer rubber.

2. Composition as in claim 1 in which the polymer is isobutylene-isoprene copolymer.

3. Composition as in claim 1 in which the polymer is ethylene-propylene-non-conjugated diene terpolymer.

4. Composition as in claim 3 in which the unsaturation in the terpolymer is present in a 5- or 6-membered ring.

5. Composition as in claim 4 in which the diene from which the unsaturation in the terpolymer is derived is dicyclopentadiene.

6. Composition as in claim 5 in which the phenol is 4,4'-isopropylidenebisphenol.

7. Composition as in claim 5 in which the phenol is p-phenyl phenol.

8. Composition as in claim 5 in which the phenol is 4,4'-biphenol.

9. Composition as in claim 5 in which the phenol is 4,4'-cyclohexylidenebisphenol.

10. Composition as in claim 3 in which the diene is selected from dicyclopentadiene, 1,4-hexadiene, methylenenorbornene, ethylidenenorbornene, and cyclooctadiene.

References Cited

UNITED STATES PATENTS

| | | | |
|---|---|---|---|
| 3,321,428 | 5/1967 | Tordella | 260—45.95 |
| 3,343,582 | 9/1967 | Himes et al. | 260—45.95 |
| 3,379,701 | 4/1968 | Gladding et al. | 260—45.95 |
| 3,390,126 | 6/1968 | Davis | 260—45.95 |
| 3,020,259 | 2/1962 | Scholde et al. | 260—45.95 |

HOSEA E. TAYLOR, Jr., Primary Examiner

U.S. Cl. X.R.

260—29.7, 45.9